(12) United States Patent
Xia et al.

(10) Patent No.: US 11,881,557 B2
(45) Date of Patent: Jan. 23, 2024

(54) LITHIUM ION ELECTROLYTE, PREPARATION METHOD AND APPLICATION THEREOF

(71) Applicant: SHANGHAI AOWEI TECHNOLOGY DEVELOPMENT CO., LTD., Shanghai (CN)

(72) Inventors: Hengheng Xia, Shanghai (CN); Zhongxun An, Shanghai (CN); Chongyang Yang, Shanghai (CN); Xueru Xu, Shanghai (CN); Lulu Suo, Shanghai (CN); Tingli Huang, Shanghai (CN); Mingxia Wu, Shanghai (CN); Jiafei Yu, Shanghai (CN); Li Hua, Shanghai (CN)

(73) Assignee: SHANGHAI AOWEI TECHNOLOGY DEVELOPMENT CO., LTD., Shanghai (CN)

( * ) Notice: Subject to any disclaimer, the term of this patent is extended or adjusted under 35 U.S.C. 154(b) by 0 days.

(21) Appl. No.: 18/200,034

(22) Filed: May 22, 2023

(65) Prior Publication Data
US 2023/0327204 A1    Oct. 12, 2023

Related U.S. Application Data

(63) Continuation of application No. PCT/CN2021/085419, filed on Apr. 2, 2021.

(30) Foreign Application Priority Data

Jan. 27, 2021   (CN) .......................... 202110112680.6

(51) Int. Cl.
| | |
|---|---|
| *H01M 10/0567* | (2010.01) |
| *H01M 10/0525* | (2010.01) |
| *H01M 10/0569* | (2010.01) |
| *H01M 4/133* | (2010.01) |
| *H01M 4/131* | (2010.01) |

(52) U.S. Cl.
CPC ....... *H01M 10/0567* (2013.01); *H01M 4/131* (2013.01); *H01M 4/133* (2013.01); *H01M 10/0525* (2013.01); *H01M 10/0569* (2013.01); *H01M 2300/0042* (2013.01)

(58) Field of Classification Search
None
See application file for complete search history.

(56) References Cited

U.S. PATENT DOCUMENTS

| | | |
|---|---|---|
| 2006/0269843 A1 | 11/2006 | Usami et al. |
| 2019/0020062 A1 | 1/2019 | Moganty et al. |
| 2020/0212486 A1 | 7/2020 | Xu et al. |

FOREIGN PATENT DOCUMENTS

| | | |
|---|---|---|
| CN | 101663790 A | 3/2010 |
| CN | 106848393 A | 6/2017 |
| CN | 106935801 A | 7/2017 |
| CN | 107180998 A | 9/2017 |
| CN | 107819152 A | 3/2018 |
| CN | 109755648 A | 5/2019 |
| CN | 110121799 A | 8/2019 |
| CN | 111525192 A | 8/2020 |
| CN | 111640987 A | 9/2020 |
| JP | 2001196093 A | 7/2001 |
| JP | 2002042864 A | 2/2002 |

*Primary Examiner* — Carlos Barcena
(74) *Attorney, Agent, or Firm* — Bayramoglu Law Offices LLC

(57) ABSTRACT

A lithium ion electrolyte, a preparation method and application thereof are provided. The lithium ion electrolyte includes: an ester solvent, a lithium salt and an electrolyte additive, where the electrolyte additive includes a compound as shown in the following formula I. According to the electrolyte provided by the present disclosure, all components have a synergistic effect and are matched with one another, so that the electrolyte can improve the interface stability of a high-nickel positive electrode material and prolong the cycle life of a lithium ion battery and a lithium ion capacitor.

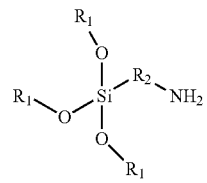

Formula I

20 Claims, 1 Drawing Sheet

LITHIUM ION ELECTROLYTE, PREPARATION METHOD AND APPLICATION THEREOF

CROSS REFERENCE TO THE RELATED APPLICATIONS

This application is a continuation application of International Application No. PCT/CN2021/085419, filed on Apr. 2, 2021, which is based upon and claims priority to Chinese Patent Application No. 202110112680.6, filed on Jan. 27, 2021, the entire contents of which are incorporated herein by reference.

TECHNICAL FIELD

The present disclosure belongs to the technical field of new energy storage, in particular to a lithium ion electrolyte, a preparation method and application thereof.

BACKGROUND

Lithium ion secondary batteries, as the most widely used chemical energy storage devices, have excellent performance in energy density, power characteristics and high and low temperature performance. In recent years, they have been successfully applied in the digital field, new energy vehicles and the energy storage industry, and become an indispensable part of the energy Internet, and the market size has reached trillions. In recent years, due to the great popularization of the new energy vehicles, the energy density of lithium batteries has been further improved. Lithium iron phosphate batteries represented by 200 Wh/kg of the energy density and ternary batteries represented by 300 to 350 Wh/kg of the energy density have become two most important research and development directions at present. The ternary batteries with higher energy density get more attention in digital, high-power, hybrid and pure electric fields.

With the continuous improvement of the energy density of lithium ion batteries, the application proportion of high-nickel and high-voltage positive electrode materials is increased day by day. However, a higher nickel content and a higher voltage cause a higher energy density, but also obviously increase the oxidability of the surfaces of the positive electrode materials, which results in the reduced interface stability, the easy increase of the battery impedance and the quick attenuation of the battery performance. In order to improve the interface stability and cycle life of the high-nickel and high-voltage materials, surface coating, element doping and search for better electrolyte additives are commonly used. By forming an inert layer on the surface of a positive electrode, the continuous oxygenolysis of the electrolyte on the surface of the positive electrode material can be inhibited, and the dissolution of metal ions can be reduced, thereby prolonging the life of the device.

CN109755648A discloses an electrolyte, including an additive, where the additive includes a benzothiophene compound and trialkoxy boroxane, the mass percent of the benzothiophene compound in the electrolyte is 0.05 to 3%, and the mass percent of the trialkoxy boroxane in the electrolyte is 0.5 to 10%. However, the reported additive cannot improve the ion mobility well, thus reducing the film forming impedance of an SEI film, nor can it effectively capture hydrofluoric acid. Therefore, the cycle performance of the battery needs to be improved.

CN107819152A discloses a reference electrolyte capable of improving the cycle performance of a lithium-sulfur battery and a preparation method. The reference electrolyte includes an ether solvent, a lithium salt, lithium nitrate and an additive for improving the cycle performance, where the ether solvent is a mixture of two solvents, the additive for improving the cycle performance includes any one of 3-aminopropyl triethoxysilane, hexamethyldisilane or tetraethyl orthosilicate. However, the electrolyte formulation is not suitable for a lithium ion battery system, and cannot well inhibit the continuous oxygenolysis of the electrolyte on the surface of the high-nickel positive electrode material and reduce the dissolution of metal ions.

Therefore, the development of a positive electrode film forming additive with better performance, especially the electrolyte additive that inhibits metal dissolution in a high-nickel system, has great significance to improve the cycle life of the lithium ion battery and the lithium ion capacitor.

SUMMARY

In order to overcome the defects of the prior art, the present disclosure aims to provide a lithium ion electrolyte and a preparation method and application thereof. The lithium ion electrolyte can improve the interface stability of a high-nickel electrode material and prolong the cycle life of a lithium ion battery and a lithium ion capacitor.

In order to achieve the above objective, the present disclosure uses the following technical solutions:

In a first aspect, the present disclosure provides a lithium ion electrolyte, where the lithium ion electrolyte includes: an ester solvent, a lithium salt and an electrolyte additive, and the electrolyte additive includes a compound as shown in the following formula I:

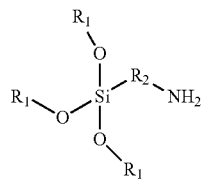

Formula I where $R_1$ is C1-C3 alkyl, and $R_2$ is C1-C5 alkyl, phenyl or C1-C5 alkyl substituted phenyl.

The C1-C3 alkyl is a linear or branched alkyl group with 1 to 3 carbons, such as methyl, ethyl, n-propyl or isopropyl.

The C1-C5 alkyl is a linear or branched alkyl group with 1 to 5 carbons, such as methyl, ethyl, n-propyl, isopropyl, n-butyl, n-amyl, etc.

The C1-C5 alkyl substituted phenyl is a linear or branched alkyl substituted phenyl with 1 to 5 carbons, such as tolyl, ethyl phenyl, m-dimethylphenyl, propyl phenyl, etc.

Preferably, the electrolyte additive includes any one of or a combination of at least two of 3-aminopropyl trimethoxysilane, 3-aminopropyl triethoxysilane, p-aminophenyl trimethoxysilane or p-aminophenyl triethoxysilane.

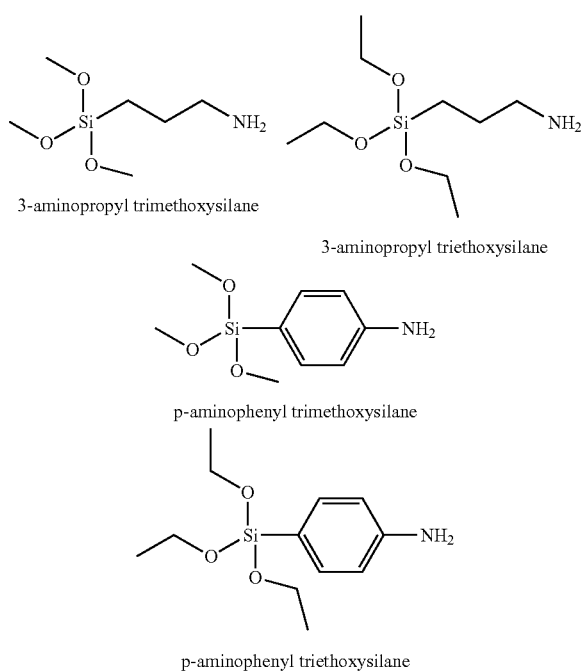

3-aminopropyl trimethoxysilane 3-aminopropyl triethoxysilane p-aminophenyl trimethoxysilane p-aminophenyl triethoxysilane Preferably, on the basis that the total mass of the lithium ion electrolyte is 100%, the addition amount of the electrolyte additive is 0.05 to 5%, such as 0.05%, 0.06%, 0.07%, 0.08%, 0.09%, 0.1%, 0.2%, 0.4%, 0.6%, 0.8%, 1%, 1.5%, 2%, 2.5%, 3%, 3.5%, 4%, 4.5%, 5%, etc.

Preferably, the electrolyte additive includes p-aminophenyl trimethoxysilane or a combination with at least one of other electrolyte additives, and the other electrolyte additives include 3-aminopropyl trimethoxysilane, 3-aminopropyl triethoxysilane or p-aminophenyl triethoxysilane.

In the present disclosure, preferably, the electrolyte additive must be the p-aminophenyl trimethoxysilane, and other silane coupling agent electrolyte additives with amino are compounded and cooperate with one another, so that the electrolyte can improve the interface stability of the high-nickel positive electrode material and prolong the cycle life of the lithium ion battery and the lithium ion capacitor.

Preferably, on the basis that the total mass of the lithium ion electrolyte is 100%, the electrolyte additive includes 0.5 to 1.5% of p-aminophenyl trimethoxysilane, 0 to 1.5% of 3-aminopropyl trimethoxysilane, 0 to 1% of 3-aminopropyl triethoxysilane and 0 to 1% of p-aminophenyl triethoxysilane according to mass percent.

On the basis that the total mass of the lithium ion electrolyte is 100%, the addition amount of the p-aminophenyl trimethoxysilane is 0.5 to 1.5%, such as 0.5%, 0.6%, 0.7%, 0.8%, 0.9%, 1.0%, 1.1%, 1.2%, 1.3%, 1.4%, 1.5%, etc.

On the basis that the total mass of the lithium ion electrolyte is 100%, the addition amount of the 3-aminopropyl trimethoxysilane is 0 to 1.5%, such as 0% (without adding the component), 0.1%, 0.2%, 0.3%, 0.4%, 0.5%, 0.6%, 0.7%, 0.8%, 0.9%, 1.0%, 1.1%, 1.2%, 1.3%, 1.4%, 1.5%, etc.

On the basis that the total mass of the lithium ion electrolyte is 100%, the addition amount of the 3-aminopropyl triethoxysilane is 0 to 1%, such as 0% (without adding the component), 0.1%, 0.2%, 0.3%, 0.4%, 0.5%, 0.6%, 0.7%, 0.8%, 0.9% and 1.0%.

On the basis that the total mass of the lithium ion electrolyte is 100%, the addition amount of the p-aminophenyl triethoxysilane is 0 to 1%, such as 0% (without adding the component), 0.1%, 0.2%, 0.3%, 0.4%, 0.5%, 0.6%, 0.7%, 0.8%, 0.9% and 1.0%.

Preferably, the electrolyte additive further includes: any one of or a combination of at least two of vinylene carbonate, fluoroethylene carbonate, ethylene sulfate, 1,3-propane sultone, 1,3-propene sultone or tri(trimethylsilane) phosphate ester.

Preferably, on the basis that the total mass of the lithium ion electrolyte is 100%, the electrolyte additive further includes: 0.5 to 2.5% of vinylene carbonate, 0.5 to 1.5% of fluoroethylene carbonate, 0.2 to 1.5% of ethylene sulfate, 0.2 to 1.2% of 1,3-propane sultone, 0.3 to 1.3% of 1,3-propene sultone and 0.2 to 0.8% of tri(trimethylsilane) phosphate ester according to mass percent.

On the basis that the total mass of the lithium ion electrolyte is 100%, the addition amount of the vinylene carbonate is 0.5 to 2.5%, such as 0.5%, 0.6%, 0.7%, 0.8%, 0.9%, 1%, 1.2%, 1.4%, 1.6%, 1.8%, 2%, 2.1%, 2.3%, 2.5%, etc.

On the basis that the total mass of the lithium ion electrolyte is 100%, the addition amount of the fluoroethylene carbonate is 0.5 to 1.5%, such as 0.5%, 0.6%, 0.7%, 0.8%, 0.9%, 1.0%, 1.1%, 1.2%, 1.3%, 1.4%, 1.5%, etc.

On the basis that the total mass of the lithium ion electrolyte is 100%, the addition amount of the ethylene sulfate is 0.2 to 1.5%, such as 0.2%, 0.3%, 0.4%, 0.5%, 0.6%, 0.7%, 0.8%, 0.9%, 1.0%, 1.1%, 1.2%, 1.3%, 1.4%, 1.5%, etc.

On the basis that the total mass of the lithium ion electrolyte is 100%, the addition amount of the 1,3-propane sultone is 0.2 to 1.2%, such as 0.2%, 0.3%, 0.4%, 0.5%, 0.6%, 0.7%, 0.8%, 0.9%, 1.0%, 1.1%, 1.2%, etc.

On the basis that the total mass of the lithium ion electrolyte is 100%, the addition amount of the 1,3-propene sultone is 0.3 to 1.3%, such as 0.3%, 0.4%, 0.5%, 0.6%, 0.7%, 0.8%, 0.9%, 1.0%, 1.1%, 1.2%, 1.3%, etc.

On the basis that the total mass of the lithium ion electrolyte is 100%, the addition amount of the tri(trimethylsilane) phosphate ester is 0.2 to 0.8%, such as 0.2%, 0.3%, 0.4%, 0.5%, 0.6%, 0.7%, 0.8%, etc.

Preferably, the ester solvent includes any one of or a combination of at least two of ethylene carbonate, propylene carbonate, ethyl methyl carbonate, dimethyl carbonate or diethyl carbonate.

Preferably, on the basis that the total mass of the ester solvent is 100%, the ester solvent includes: 5 to 40% of ethylene carbonate, 0 to 20% of propylene carbonate, 5 to 35% of ethyl methyl carbonate, 5 to 30% of dimethyl carbonate and 5 to 25% of diethyl carbonate according to mass percent.

On the basis that the total mass of the ester solvent is 100%, the addition amount of the ethylene carbonate is 5 to 40%, such as 5%, 6%, 8%, 10%, 12%, 14%, 16%, 18%, 20%, 22%, 24%, 26%, 28%, 30%, 32%, 34%, 36%, 38%, 40%, etc.

On the basis that the total mass of the ester solvent is 100%, the addition amount of the propylene carbonate is 0 to 20%, such as 0%, 1%, 2%, 3%, 4%, 5%, 6%, 7%, 8%, 9%, 10, 1%, 12%, 13%, 14%, 15%, 16%, 17%, 18%, 19%, 20%, etc.

On the basis that the total mass of the ester solvent is 100%, the addition amount of the ethyl methyl carbonate is 5 to 35%, such as 5%, 6%, 7%, 8%, 9%, 10%, 11%, 12%, 13%, 14%, 15%, 16%, 17%, 18%, 19%, 20%, 22%, 24%, 26%, 28%, 30%, 31%, 33%, 35%, etc.

On the basis that the total mass of the ester solvent is 100%, the addition amount of the dimethyl carbonate is 5 to 30%, such as 5%, 6%, 7%, 8%, 9%, 10%, 11%, 12%, 13%, 14%, 15%, 16%, 17%, 18%, 19%, 20%, 21%, 22%, 23%, 24%, 25%, 26%, 28%, 30%, etc.

On the basis that the total mass of the ester solvent is 100%, the addition amount of the diethyl carbonate is 5 to 25%, such as 5%, 6%, 7%, 8%, 9%, 10%, 11%, 12%, 13%, 14%, 15%, 16%, 17%, 18%, 19%, 20%, 21%, 22%, 23%, 24%, 25%, etc.

Preferably, the lithium salt includes any one of or a combination of at least two of lithium hexafluorophosphate, lithium difluorophosphate, lithium tetrafluoroborate or lithium difluoro(oxalato)borate.

Preferably, the concentration of the lithium salt in the lithium ion electrolyte is 0.5 to 2.0 mol/L, such as 0.5 mol/L, 0.6 mol/L, 0.7 mol/L, 0.8 mol/L, 0.9 mol/L, 1.0 mol/L, 1.1 mol/L, 1.2 mol/L, 1.3 mol/L, 1.4 mol/L, 1.5 mol/L, 1.6 mol/L, 1.7 mol/L, 1.8 mol/L, 1.9 mol/L, 2.0 mol/L, etc.

Preferably, on the basis that the total mole number of the lithium salt is 100%, the lithium salt includes: 80 to 100% of lithium hexafluorophosphate, 0 to 10% of lithium difluorophosphate, 0 to 5% of lithium tetrafluoroborate and 0 to 5% of lithium difluoro(oxalato)borate according to mole percent.

On the basis that the total mole number of the lithium salt is 100%, the addition amount of the lithium hexafluorophosphate is 80 to 100%, such as 80%, 81%, 82%, 83%, 84%, 85%, 86%, 87%, 88%, 89%, 90%, 91%, 92%, 93%, 94%, 95%, 96%, 97%, 98%, 99%, 100%, etc.

On the basis that the total mole number of the lithium salt is 100%, the addition amount of the lithium difluorophosphate is 0 to 10%, such as 0%, 1%, 2%, 3%, 4%, 5%, 6%, 7%, 8%, 9%, 10%, etc.

On the basis that the total mole number of the lithium salt is 100%, the addition amount of the lithium tetrafluoroborate is 0 to 5%, such as 0%, 1%, 2%, 3%, 4%, 5%, etc.

On the basis that the total mole number of the lithium salt is 100%, the addition amount of the lithium difluoro(oxalato)borate is 0 to 5%, such as 0%, 1%, 2%, 3%, 4%, 5%, etc.

In a second aspect, the present disclosure provides a preparation method for the lithium ion electrolyte according to the first aspect, where the preparation method includes: mixing the ester solvent, the lithium salt and the electrolyte additive to obtain the lithium ion electrolyte.

Preferably, the mixing temperature is 0 to 25° C., such as 0° C. 5° C., 10° C., 15° C., 20° C., 25° C., etc., and the mixing time is 5 to 60 min, such as 5 min, 10 min, 20 min, 30 min, 40 min, 50 min, 60 min, etc.

Preferably, the preparation method includes the following steps:

(1) preparing a formulation amount of ethylene carbonate, propylene carbonate, ethyl methyl carbonate, dimethyl carbonate and diethyl carbonate into the ester solvent;

(2) adding a formulation amount of lithium salt to the ester solvent obtained in the step (1), and mixing to obtain a lithium containing solution; and (3) adding a formulation amount of electrolyte additive to the lithium containing solution obtained in the step (2), and mixing to obtain the lithium ion electrolyte.

In a third aspect, the present disclosure provides a lithium ion battery, where the lithium ion battery includes the lithium ion electrolyte according to the first aspect. The lithium ion battery provided by the present disclosure has a good long-life characteristic.

Preferably, positive and negative electrodes of the lithium ion battery provided by the present disclosure are respectively made of a lithium nickel-cobalt-manganate ternary material (NCM811) and a graphite negative electrode material, and the battery is designed to have the capacity of 3 Ah and the working voltage of 2.5 to 4.2 V.

In a fourth aspect, the present disclosure provides a lithium ion capacitor, where the lithium ion capacitor includes the lithium ion electrolyte according to the first aspect. The lithium ion capacitor provided by the present disclosure has a high-power characteristic and long cycle life.

Preferably, positive and negative electrodes of the lithium ion capacitor provided by the present disclosure are respectively made of a lithium nickel-cobalt-manganate ternary material (NCM811) and an activated carbon material, and the capacitor is designed to have the capacity of 2000 F and the working voltage of 0.5 to 2.8 V.

Compared with the prior art, the present disclosure has the following beneficial effects:

(1) the electrolyte additive provided by the present disclosure can obviously improve the interface stability of a high-nickel ternary material and prolong the cycle life of the lithium ion battery and the lithium ion capacitor;

(2) according to the electrolyte provided by the present disclosure, all components have a synergistic effect and are matched with one another, so that the electrolyte can improve the interface stability of the high-nickel positive electrode material and prolong the cycle life of the lithium ion battery and the lithium ion capacitor; and (3) when the electrolyte provided by the present disclosure is used for the 3Ah (ternary NCM811-graphite) lithium ion battery, after 1,000 cycles at 3C, the capacity exceeds 2000 mAh, and the capacity retention rate is about 80%; and when the electrolyte provided by the present disclosure is used for the 2000F (ternary NCM811-activated carbon) lithium ion capacitor, after 20,000 cycles, the energy retention rate exceeds 90%.

DETAILED DESCRIPTION

Figure 1:
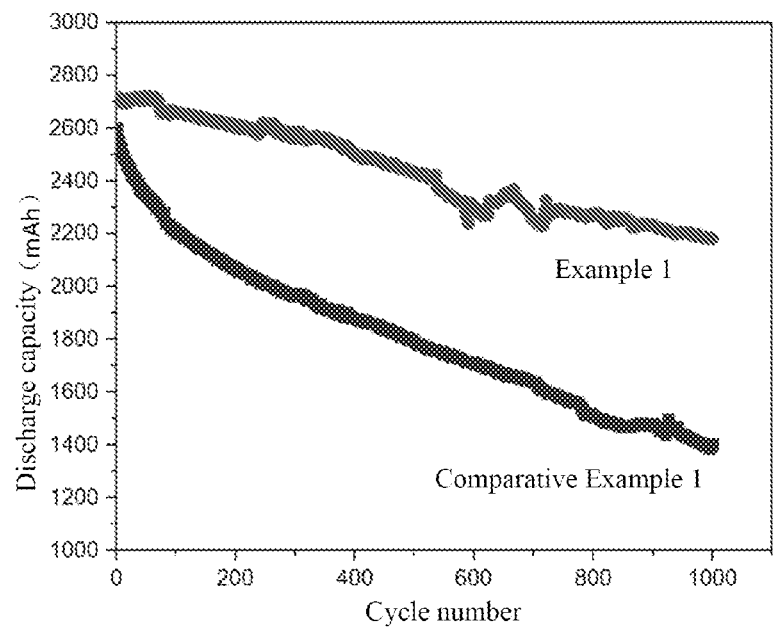
FIG. 1 shows cycle life-discharge capacity curves of electrolytes prepared by Example 1 and Comparative Example 1 for a 3Ah (ternary NCM811-graphite) lithium ion battery.

The technical solution of the present disclosure will be further described below with reference to specific embodiments. A person skilled in the art should understand that the examples are only used for understanding the present disclosure and should not be understood as the limitation to the present disclosure.

Example 1

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

A preparation method for the lithium ion electrolyte provided by this example included the following steps:

(1) preparing a formulation amount of ethylene carbonate, propylene carbonate, ethyl methyl carbonate, dimethyl carbonate and diethyl carbonate into the ester solvent;

(2) adding a formulation amount of lithium salt to the ester solvent obtained in the step (1), and mixing to obtain a lithium containing solution; and (3) adding a formulation amount of electrolyte additive to the lithium containing solution obtained in the step (2), and mixing to obtain the lithium ion electrolyte.

Example 2

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 3

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl triethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 4

The example provided a lithium ion electrolyte, where the lithium ion electrolyte included the following components:

| | Component | | Content (on the basis that the total mass of the lithium ion electrolyte is 100%) | |
|---|---|---|---|---|
| Electrolyte additive | P-aminophenyl triethoxysilane | | 0.1% | |
| | P-aminophenyl trimethoxysilane | | 0.3% | |
| | Vinylene carbonate | | 1.5% | |
| | Fluoroethylene carbonate | | 0.5% | |
| | Ethylene sulfate | | 0.3% | |
| | 1,3-propane sultone | | 0.5% | |
| | 1,3-propene sultone | | 0.3% | |
| | Tri(trimethylsilane) phosphate ester | | 0.5% | |
| Lithium salt | Lithium hexafluorophosphate | 97.5 mol % | | 1.15 mol/L |
| | Lithium difluorophosphate | 1.5 mol % | | |
| | Lithium tetrafluoroborate | 0.5 mol % | | |
| | Lithium difluoro(oxalato)borate | 0.5 mol % | | |
| | Total lithium salt | 100 mol % | | |
| Ester solvent | Ethylene carbonate | 23 wt % | The balance | |
| | Propylene carbonate | 7 wt % | | |
| | Ethyl methyl carbonate | 30 wt % | | |
| | Dimethyl carbonate | 20 wt % | | |
| | Diethyl carbonate | 20 wt % | | |
| | Total solvent | 100 wt % | | |

The preparation method for the lithium ion electrolyte provided by this example was the same as that of Example 1.

Example 5

The example provided a lithium ion electrolyte, where the lithium ion electrolyte included the following components:

| | Component | | Content (on the basis that the total mass of the lithium ion electrolyte is 100%) | |
|---|---|---|---|---|
| Electrolyte additive | P-aminophenyl trimethoxysilane | | 0.4% | |
| | Vinylene carbonate | | 1.5% | |
| | Fluoroethylene carbonate | | 0.5% | |
| | Ethylene sulfate | | 0.3% | |
| | 1,3-propane sultone | | 0.5% | |
| | 1,3-propene sultone | | 0.3% | |
| | Tri(trimethylsilane) phosphate ester | | 0.5% | |
| Lithium salt | Lithium hexafluorophosphate | 97.5 mol % | | 1.15 mol/L |
| | Lithium difluorophosphate | 1.5 mol % | | |
| | Lithium tetrafluoroborate | 0.5 mol % | | |
| | Lithium difluoro(oxalato)borate | 0.5 mol % | | |
| | Total lithium salt | 100 mol % | | |
| Ester solvent | Ethylene carbonate | 23 wt % | The balance | |
| | Propylene carbonate | 7 wt % | | |
| | Ethyl methyl carbonate | 30 wt % | | |
| | Dimethyl carbonate | 20 wt % | | |
| | Diethyl carbonate | 20 wt % | | |
| | Total solvent | 100 wt % | | |

The preparation method for the lithium ion electrolyte provided by this example was the same as that of Example 1.

Example 6

The example provided a lithium ion electrolyte, where the lithium ion electrolyte included the following components:

| | Component | Content (on the basis that the total mass of the lithium ion electrolyte is 100%) |
|---|---|---|
| Electrolyte additive | 3-aminopropyl trimethoxysilane | 0.4% |
| | Vinylene carbonate | 1.5% |
| | Fluoroethylene carbonate | 0.5% |
| | Ethylene sulfate | 0.3% |
| | 1,3-propane sultone | 0.5% |
| | 1,3-propene sultone | 0.3% |
| | Tri(trimethylsilane) phosphate ester | 0.5% |

The preparation method for the lithium ion electrolyte provided by this example was the same as that of Example 1.

Example 7

The example provided a lithium ion electrolyte, where the lithium ion electrolyte included the following components:

| | Component | | Content (on the basis that the total mass of the lithium ion electrolyte is 100%) | |
|---|---|---|---|---|
| Electrolyte additive | 3-aminopropyl trimethoxysilane | | 0.1% | |
| | P-aminophenyl trimethoxysilane | | 0.3% | |
| | Fluoroethylene carbonate | | 0.8% | |
| | Ethylene sulfate | | 0.6% | |
| | 1,3-propane sultone | | 0.8% | |
| | 1,3-propene sultone | | 0.6% | |
| | Tri(trimethylsilane) phosphate ester | | 0.8% | |
| Lithium salt | Lithium hexafluorophosphate | 97.5 mol % | | 1.15 mol/L |
| | Lithium difluorophosphate | 1.5 mol % | | |
| | Lithium tetrafluoroborate | 0.5 mol % | | |
| | Lithium difluoro(oxalato)borate | 0.5 mol % | | |
| | Total lithium salt | 100 mol % | | |

-continued

| Component | | Content (on the basis that the total mass of the lithium ion electrolyte is 100%) | |
|---|---|---|---|
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 8

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.6% | |
| | Ethylene sulfate | 0.4% | |
| | 1,3-propane sultone | 0.6% | |
| | 1,3-propene sultone | 0.4% | |
| | Tri(trimethylsilane) phosphate ester | 0.6% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 9

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.6% | |
| | Fluoroethylene carbonate | 0.6% | |
| | 1,3-propane sultone | 0.6% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 10

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.8% | |
| | 1,3-propene sultone | | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 11

The example provided a lithium ion electrolyte, where the lithium ion electrolyte included the following components:

| Component | | | Content (on the basis that the total mass of the lithium ion electrolyte is 100%) |
|---|---|---|---|
| Electrolyte additive | 3-aminopropyl trimethoxysilane | | 0.1% |
| | P-aminophenyl trimethoxysilane | | 0.3% |
| | Vinylene carbonate | | 1.5% |
| | Fluoroethylene carbonate | | 0.5% |
| | Ethylene sulfate | | 0.3% |
| | 1,3-propene sultone | | 0.8% |
| | Tri(trimethylsilane) phosphate ester | | 0.5% |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 12

The example provided a lithium ion electrolyte, where the lithium ion electrolyte included the following components:

| Component | | | Content (on the basis that the total mass of the lithium ion electrolyte is 100%) |
|---|---|---|---|
| Electrolyte additive | 3-aminopropyl trimethoxysilane | | 0.1% |
| | P-aminophenyl trimethoxysilane | | 0.3% |
| | Vinylene carbonate | | 1.6% |
| | Fluoroethylene carbonate | | 0.6% |
| | Ethylene sulfate | | 0.4% |
| | 1,3-propane sultone | | 0.8% |
| | 1,3-propene sultone | | 0.6% |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 11

The example provided a lithium ion electrolyte, where the lithium ion electrolyte included the following components:

| Component | | | Content (on the basis that the total mass of the lithium ion electrolyte is 100%) |
|---|---|---|---|
| Electrolyte additive | 3-aminopropyl trimethoxysilane | | 0.1% |
| | P-aminophenyl trimethoxysilane | | 0.3% |
| | Vinylene carbonate | | 1.5% |
| | Fluoroethylene carbonate | | 0.5% |
| | Ethylene sulfate | | 0.3% |
| | 1,3-propane sultone | | 0.5% |
| | 1,3-propene sultone | | 0.3% |
| | Tri(trimethylsilane) phosphate ester | | 0.5% |
| Lithium salt | Lithium hexafluorophosphate | 97.5 mol % | 1.15 mol/L |
| | Lithium tetrafluoroborate | 1.5 mol % | |
| | Lithium difluoro(oxalato)borate | 1.0 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 12

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | |
| | Lithium difluorophosphate | 2.0 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 13

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 1.0 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this example was the same as that of Example 1.

Example 14

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Propylene carbonate | 12 wt % | The balance |
| | Ethyl methyl carbonate | 36 wt % | |
| | Dimethyl carbonate | 26 wt % | |
| | Diethyl carbonate | 26 wt % | |
| | Total solvent | 100 wt % | |

The preparation method for the lithium ion electrolyte provided by this example was the same as that of Example 1.

Example 15

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |

-continued

| Component | | Content (on the basis that the total mass of the lithium ion electrolyte is 100%) | |
|---|---|---|---|
| Ester solvent | Ethylene carbonate | 25 wt % | The balance |
| | Ethyl methyl carbonate | 32 wt % | |
| | Dimethyl carbonate | 22 wt % | |
| | Diethyl carbonate | 21 wt % | |
| | Total solvent | 100 wt % | |

The preparation method for the lithium ion electrolyte provided by this example was the same as that of Example 1.

Example 16

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 30.5 wt % | The balance |
| | Propylene carbonate | 14.5 wt % | |
| | Dimethyl carbonate | 27.5 wt % | |
| | Diethyl carbonate | 27.5 wt % | |
| | Total solvent | 100 wt % | |

The preparation method for the lithium ion electrolyte provided by this example was the same as that of Example 1.

Example 17

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 28 wt % | The balance |
| | Propylene carbonate | 12 wt % | |
| | Ethyl methyl carbonate | 35 wt % | |
| | Diethyl carbonate | 25 wt % | |
| | Total solvent | 100 wt % | |

The preparation method for the lithium ion electrolyte provided by this example was the same as that of Example 1.

Example 18

The example provided a lithium ion electrolyte, where the lithium ion electrolyte included the following components:

| Component | | Content (on the basis that the total mass of the lithium ion electrolyte is 100%) | |
|---|---|---|---|
| Electrolyte additive | 3-aminopropyl trimethoxysilane | 0.1% | |
| | P-aminophenyl trimethoxysilane | 0.3% | |
| | Vinylene carbonate | 1.5% | |
| | Fluoroethylene carbonate | 0.5% | |
| | Ethylene sulfate | 0.3% | |
| | 1,3-propane sultone | 0.5% | |
| | 1,3-propene sultone | 0.3% | |
| | Tri(trimethylsilane) phosphate ester | 0.5% | |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 28 wt % | The balance |
| | Propylene carbonate | 12 wt % | |
| | Ethyl methyl carbonate | 35 wt % | |
| | Dimethyl carbonate | 25 wt % | |
| | Total solvent | 100 wt % | |

The preparation method for the lithium ion electrolyte provided by this example was the same as that of Example 1.

Comparative Example 1

The comparative example provided a lithium ion electrolyte, where the lithium ion electrolyte included the following components:

| | Component | | Content (on the basis that the total mass of the lithium ion electrolyte is 100%) |
|---|---|---|---|
| Electrolyte additive | Vinylene carbonate | | 1.5% |
| | Fluoroethylene carbonate | | 0.5% |
| | Ethylene sulfate | | 0.3% |
| | 1,3-propane sultone | | 0.5% |
| | 1,3-propene sultone | | 0.3% |
| | Tri(trimethylsilane) phosphate ester | | 0.5% |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this comparative example was the same as that of Example 1.

Comparative Example 2

The comparative example provided a lithium ion electrolyte, where the lithium ion electrolyte included the following components:

| | Component | | Content (on the basis that the total mass of the lithium ion electrolyte is 100%) |
|---|---|---|---|
| Electrolyte additive | Vinylene carbonate | | 1.5% |
| | Fluoroethylene carbonate | | 0.5% |
| | Ethylene sulfate | | 0.3% |
| | 1,3-propane sultone | | 0.5% |
| | 1,3-propene sultone | | 0.3% |
| | Tri(trimethylsilane) phosphate ester | | 0.5% |
| Lithium salt | Lithium hexafluorophosphate | 97.5 mol % | 1.15 mol/L |
| | Lithium difluorophosphate | 1.5 mol % | |
| | Lithium tetrafluoroborate | 0.5 mol % | |
| | Lithium difluoro(oxalato)borate | 0.5 mol % | |
| | Total lithium salt | 100 mol % | |
| Ester solvent | Ethylene carbonate | 23 wt % | The balance |
| | Propylene carbonate | 7 wt % | |
| | Ethyl methyl carbonate | 30 wt % | |
| | Dimethyl carbonate | 20 wt % | |
| | Diethyl carbonate | 20 wt % | |
| | Total solvent | 100 wt % | |

The preparation method for the lithium ion electrolyte provided by this comparative example was the same as that of Example 1.

Comparative Example 3

The comparative example provided a lithium ion electrolyte and differed from Example 1 only in that 3-aminopropyl trimethoxysilane and p-aminophenyl trimethoxysilane were not added to an electrolyte additive, the content of vinylene carbonate was increased to 1.9%, and the contents of other components and a preparation method were the same as those of Example 1.

Comparative Example 4

The comparative example provided a lithium ion electrolyte and differed from Example 1 only in that 3-aminopropyl trimethoxysilane and p-aminophenyl trimethoxysilane were not added to an electrolyte additive, 0.4% of γ-(2,3-epoxy propoxy) propyl trimethoxysilane was added, and the contents of other components and a preparation method were the same as that of Example 1.

Performance Test

A cycle performance test is performed on the lithium ion electrolytes provided by Examples 1-18 and Comparative Examples 1-4, and a specific test method is shown as follows:

(1) Cycle life-discharge capacity:

A lithium ion battery that is designed to have the capacity of 3 Ah is tested by using Arbin charge and discharge equipment, and the method includes the following steps: 1) discharging to 2.5 V at a constant current of 9 A; 2) charging to 4.2 V at a constant current of 9 A; 3) charging for 1 min at a constant voltage of 4.2 V; and 4) circulating the steps 1) to 3) for 1,000 times, finishing, and calculating the discharge capacity of each cycle.

(2) Cycle life-energy retention rate: a lithium ion capacitor that is designed to have the capacity of 2000 F is tested by using the Arbin charge and discharge equipment, and the method includes the following steps: 1) discharging to 2.8 V at a constant current of 15 A; 2) charging to 0.5 V at a constant current of 15 A; 3) charging for 1 min at a constant voltage of 2.8 V; and 4) circulating the steps 1) to 3) for 20,000 times, finishing, calculating the discharge energy of each cycle, and calculating the energy retention rate on the basis of the 10th cycle.

Specific test results are shown as follows ("—" indicates that the test is not performed):

TABLE 1

| Item | 3 Ah cycle life-capacity/mAh | 2000F cycle life-energy retention rate/% |
|---|---|---|
| Example 1 | 2184.4 | — |
| Example 2 | — | 92.4 |
| Example 3 | 2120.1 | — |
| Example 4 | 2136.2 | — |
| Example 5 | 2085.3 | — |
| Example 6 | 2099.1 | — |
| Example 7 | 2066.5 | — |
| Example 8 | 2009.5 | — |
| Example 9 | 1998.6 | — |
| Example 10 | 1825.2 | — |
| Example 11 | 2010.9 | — |
| Example 12 | 2009.3 | — |
| Example 13 | 1919.5 | — |
| Example 14 | 1901.6 | — |
| Example 15 | 1952.4 | — |
| Example 16 | 1883.2 | — |
| Example 17 | 1652.8 | — |
| Example 18 | 1856.8 | — |
| Comparative Example 1 | 1386.4 | — |
| Comparative Example 2 | — | 78.2 |
| Comparative Example 3 | 1485.6 | — |
| Comparative Example 4 | 1769.5 | — |

As can be seen from data in Table 1, the electrolyte provided by the present disclosure has a capacity retention rate of more than 80% after 1000 cycles of the 3Ah (ternary NCM811-graphite) lithium ion battery; after 20,000 cycles of the 2000F (ternary NCM811-activated carbon) lithium ion capacitor, the energy retention rate is more than 90%. It is shown that the electrolyte additive provided by the present disclosure can obviously improve the interface stability of the high-nickel ternary material and prolong the cycle life of the lithium ion battery and the lithium ion capacitor; and according to the electrolyte provided by the present disclosure, all components have a synergistic effect and are matched with one another, so that the electrolyte can improve the interface stability of the high-nickel positive electrode material and prolong the cycle life of the lithium ion battery and the lithium ion capacitor.

Figure 2:
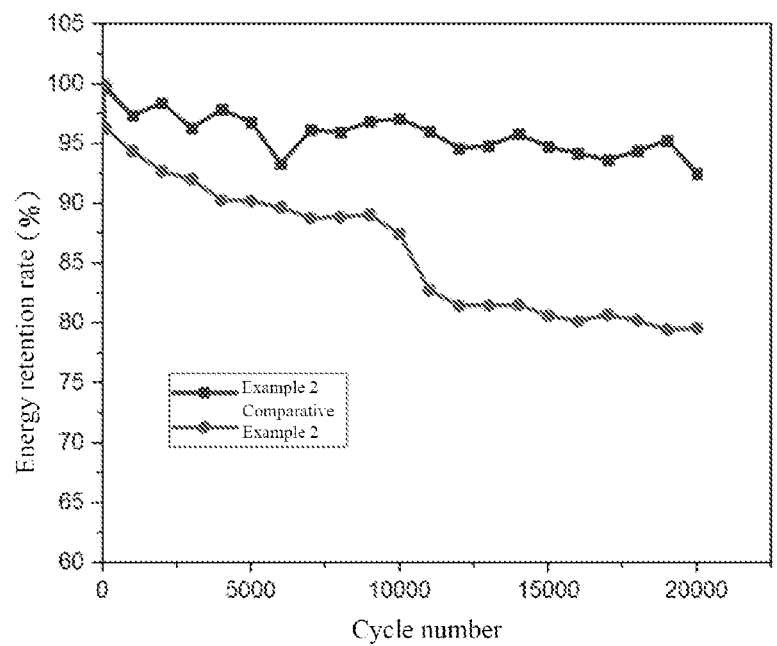
FIG. 2 shows cycle life-energy retention rate curves of electrolytes prepared by Example 2 and Comparative Example 2 for a 2000F (ternary NCM811-activated carbon) lithium ion capacitor.

FIG. 1 shows cycle life-discharge capacity curves of electrolytes prepared by Example 1 and Comparative Example 1 for a 3Ah (ternary NCM811-graphite) lithium ion battery; and FIG. 2 shows cycle life-energy retention rate curves of electrolytes prepared by Example 2 and Comparative Example 2 for a 2000F (ternary NCM811-activated carbon) lithium ion capacitor. It can be visually found in FIG. 1 and FIG. 2 that the addition of the lithium ion electrolyte of a compound shown in the formula I of the present disclosure can improve the interface stability of the high-nickel electrode material and prolong the cycle life of the lithium ion battery and the lithium ion capacitor.

The applicant states that the present disclosure illustrates the lithium ion electrolyte and the preparation method and application thereof with reference to the above examples, but the present disclosure is not limited to the above examples, that is, it does not mean that the present disclosure can be implemented only in dependence on the above examples. A person skilled in the art should understand that any improvement to the present disclosure, equivalent replacement of raw materials of the product of the present disclosure, addition of auxiliary components and selection of specific methods shall fall within the scope of protection and disclosure of the present disclosure.

What is claimed is:

1. A lithium ion battery, wherein the lithium ion battery comprises a lithium ion electrolyte, a positive electrode and a negative electrode of the lithium ion battery are respectively made of a lithium nickel-cobalt-manganate ternary material and a graphite negative electrode material, and the lithium ion battery is designed to have a capacity of 3 Ah and a working voltage of 2.5 to 4.2 V;

the lithium ion electrolyte comprises: an ester solvent, a lithium salt, and an electrolyte additive, the electrolyte additive comprises p-aminophenyl trimethoxysilane or a combination of the p-aminophenyl trimethoxysilane with at least one of other electrolyte additives, and the other electrolyte additives comprise 3-aminopropyl trimethoxysilane, 3-aminopropyl triethoxysilane or p-aminophenyl triethoxysilane, on a basis that a total mass of the lithium ion electrolyte is 100%, a mass fraction of the p-aminophenyl trimethoxysilane is 0.5 to 1.5%.

2. The lithium ion battery according to claim 1, wherein on the basis that the total mass of the lithium ion electrolyte is 100%, an addition amount of the electrolyte additive is to 5%.

3. The lithium ion battery according to claim 1, wherein on the basis that the total mass of the lithium ion electrolyte is 100%, the electrolyte additive comprises 0 to 1.5% of the 3-aminopropyl trimethoxysilane, 0 to 1% of the 3-aminopropyl triethoxysilane, and 0 to 1% of the p-aminophenyl triethoxysilane according to a mass percent.

4. The lithium ion battery according to claim 1, wherein the electrolyte additive further comprises: any one of or a combination of at least two of vinylene carbonate, fluoroethylene carbonate, ethylene sulfate, 1,3-propane sultone, 1,3-propene sultone, or tri(trimethylsilane) phosphate ester.

5. The lithium ion battery according to claim 4, wherein on the basis that the total mass of the lithium ion electrolyte is 100%, the electrolyte additive further comprises: 0.5 to 2.5% of the vinylene carbonate, 0.5 to 1.5% of the fluoroethylene carbonate, 0.2 to 1.5% of the ethylene sulfate, 0.2 to 1.2% of the 1,3-propane sultone, 0.3 to 1.3% of the 1,3-propene sultone, and 0.2 to 0.8% of the tri(trimethylsilane) phosphate ester according to a mass percent.

6. The lithium ion battery according to claim 1, wherein the ester solvent comprises ethylene carbonate, propylene carbonate, ethyl methyl carbonate, dimethyl carbonate, and diethyl carbonate.

7. The lithium ion battery according to claim 6, wherein on a basis that a total mass of the ester solvent is 100%, the ester solvent comprises: 5 to 40% of the ethylene carbonate, 0 to 20% of the propylene carbonate, 5 to 35% of the ethyl methyl carbonate, 5 to 30% of the dimethyl carbonate, and 5 to 25% of the diethyl carbonate according to a mass percent.

8. The lithium ion battery according to claim 1, wherein the lithium salt comprises any one of or a combination of at least two of lithium hexafluorophosphate, lithium difluorophosphate, lithium tetrafluoroborate, or lithium difluoro(oxalato)borate.

9. The lithium ion battery according to claim 1, wherein a concentration of the lithium salt in the lithium ion electrolyte is 0.5 to 2.0 mol/L.

10. The lithium ion battery according to claim 9, wherein on a basis that a total mole number of the lithium salt is 100%, the lithium salt comprises: 80 to 100% of lithium hexafluorophosphate, 0 to 10% of lithium difluorophosphate, 0 to 5% of lithium tetrafluoroborate, and 0 to 5% of lithium difluoro(oxalato)borate according to a mole percent.

11. The lithium ion battery according to claim 1, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

12. The lithium ion battery according to claim 11, wherein a mixing temperature is 0 to 25° C., and a mixing time is 5 to 60 min.

13. The lithium ion battery according to claim 11, wherein the lithium ion battery comprises the lithium ion electrolyte, and the preparation method for the lithium ion electrolyte comprises the following steps:
   (1) preparing a formulation amount of ethylene carbonate, propylene carbonate, ethyl methyl carbonate, dimethyl carbonate, and diethyl carbonate into the ester solvent;
   (2) adding a formulation amount of the lithium salt to the ester solvent obtained in the step (1), and mixing to obtain a lithium containing solution; and
   (3) adding a formulation amount of the electrolyte additive to the lithium containing solution obtained in the step (2), and mixing to obtain the lithium ion electrolyte.

14. The lithium ion battery according to claim 2, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

15. The lithium ion battery according to claim 3, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

16. The lithium ion battery according to claim 4, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

17. The lithium ion battery according to claim 5, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

18. The lithium ion battery according to claim 6, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

19. The lithium ion battery according to claim 7, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

20. The lithium ion battery according to claim 8, wherein the lithium ion battery comprises the lithium ion electrolyte, and a preparation method for the lithium ion electrolyte comprises: mixing the ester solvent, the lithium salt, and the electrolyte additive to obtain the lithium ion electrolyte.

\* \* \* \* \*